United States Patent [19]

Dashevsky et al.

[11] Patent Number: 5,266,658
[45] Date of Patent: Nov. 30, 1993

[54] FORMING PREBLEND OF FLEXIBLE COIL POLYMER AND BLOCK COPOLYMER OF THERMOTROPIC LIQUID CRYSTAL POLYMER AND FLEXIBLE COIL POLYMER

[75] Inventors: Sophia Dashevsky, Fair Lawn, N.J.; Ki-Soo Kim, Katonah; Stanley W. Palmaka, Yonkers, both of N.Y.

[73] Assignee: Akzo nv, Arnhem, Netherlands

[21] Appl. No.: 812,607

[22] Filed: Dec. 23, 1991

[51] Int. Cl.$^5$ .................. C08L 67/02; C08L 77/00
[52] U.S. Cl. .................. 525/444; 525/425; 525/432; 525/437
[58] Field of Search ............... 525/425, 432, 444, 437

[56] References Cited

U.S. PATENT DOCUMENTS

| | | | |
|---|---|---|---|
| 4,228,218 | 10/1980 | Takayanagi | 525/58 |
| 4,386,174 | 5/1983 | Cogswell | 525/397 |
| 4,438,236 | 3/1984 | Cogswell | 525/165 |
| 4,728,698 | 3/1988 | Isayev | 525/439 |
| 4,792,587 | 12/1988 | Kanoe | 525/131 |
| 5,043,400 | 8/1991 | Tsuruta et al. | 525/437 |

OTHER PUBLICATIONS

M. Paci, "Compatibility of Blends of Poly(Butylene terephthalate) and Liquid Crystal Polymers: A DSC Study" Thermochimica Acta 137 (1988) 105–114.

D. Dutta, "Polymer Blends Containing Liquid Crystals: A Review" Pol. Eng. & Sci. vol. 30, No. 17 (1990) 1005–1018.

M. Kimura, "Compatibility of Poly(butylene terephthalate) with a Liquid-Crystalline Copolyester" J Pol. Sci. vol. 22 (1984) 1697–1698.

B. Shin, "Speculation on Interfacial Adhesion . . . Spacer Groups" Pol. Eng. & Sci vol. 30 No. 1 (1990) pp. 13–21.

*Primary Examiner*—Patricia A. Short
*Attorney, Agent, or Firm*—Richard P. Fennelly; Louis A. Morris

[57] ABSTRACT

Preblends with improved interfacial adhesion, capable of later melt blending, can be formed by heating, above their glass transition temperatures but below their melting temperatures, a flexible coil polymer, to serve as the matrix, and a lesser amount of a block copolymer of a thermotropic liquid crystal polymer and a flexible coil polymer.

4 Claims, No Drawings

FORMING PREBLEND OF FLEXIBLE COIL POLYMER AND BLOCK COPOLYMER OF THERMOTROPIC LIQUID CRYSTAL POLYMER AND FLEXIBLE COIL POLYMER

BACKGROUND OF THE INVENTION

It is known to blend flexible coil polymers with liquid crystal polymers (LCPs) which are also termed "liquid crystalline polymers", the latter being either homopolymers or random copolymers. In such cases, the blends are formed by mixing the matrix and LCP additive under melt blending conditions for at least one of those components. Cogswell et al. in U.S. Pat. Nos. 4,386,174 and 4,438,236 advocate use of a temperature range over which the polymer capable of forming an anisotropic melt overlaps the temperature range over which the melt-processable polymer may be melt processed. (Also see Polymer Engineering and Science, Mid-September 1990, Vol. 30, No. 17, p. 1011). Isayev et al. in U.S. Pat. No. 4,728,698 indicates that mixing is to be carried out at a temperature at which both the base polymer and the LCP are melt processible. European Patent Publication No. 321,236 indicates that an LCP in powder form and of a certain particle size is to be mixed in a matrix resin at temperatures which will melt the matrix resin but will not deform the LCP. European Patent Publication No. 281,496 speaks of melt blending a polyester prepolymer and an LCP.

Thermochimica Acta, 137 (1988) 105-114 discusses preparing blends in the melt at 560° K of VECTRA brand LCP and polybutylene terephthalate. F. P. La Manta show extrusion of blends of VECTRA polymer and nylon 6 at temperatures of 260° C. and 290° C.

It has been found that melt blending of a flexible matrix polymer and an LCP under such conditions in a single step can lead to undesired inhomogeneity for the resulting blend. Therefore, there is a need for improvements in the manner in which a matrix resin and a thermotropic liquid crystal polymer can be blended.

DETAILED DESCRIPTION OF THE INVENTION

It has been found that it is possible to form a preblend of (1) a flexible coil polymer, intended for use as the matrix, and (2) a lesser amount of a segmented block copolymer containing segments of a thermotropic liquid crystal polymer (TLCP) and segments of a flexible coil polymer by simply mixing the blend of (1) and (2) above the glass transition temperature, but below the melt temperature, of both. The resulting preblend can thereafter be melt processed in a more homogeneous manner.

The present invention is especially adapted to be used in forming melt-processible preblends of the type of blends described and claimed in U.S. Ser. No. 726,600 now abandoned as well as improved versions of such blends as described and claimed in U.S. Ser. No. 812,606, pending entitled "Blend of Polyethylene Terephthalate Matrix and Thermotropic Liquid Crystal Block Copolymer" filed on even date herewith.

In the aforementioned type of blends the predominant component, e.g., 50.1% to 99.5%, is a flexible coil polymer as the matrix resin. Representative materials for the matrix include polyester and polyamide polymers such as poly(ethylene terephthalate), poly(butylene terephthalate), nylon-6,6, nylon-6, amorphous nylons and polyester thermoplastic elastomers based on poly(butylene terephthalate) and polytetramethylene oxide units.

The block copolymer is present at about 0.5% to about 49.9% and has the general formula —[Rod]$_x$—[Coil]$_y$]$_p$— where "Rod" indicates the mesogenic block with x, normally from 2 to 50, indicating the number of mesogen repeats, "Coil" indicating the block comprising the flexible coil polymer, with y, normally from about 2 to about 50, indicating the number of repeat units of the flexible coil polymer, and p representing the repeat units of Rod and Coil blocks. The mole % rod in the total polymer can range from about 4% to about 80%. The repeat unit p can range from about 1 to about very large numbers such as 50–500 for high molecular weight segmented block copolymers.

The rod length, which is responsible for liquid crystalline properties for the block copolymer combination needs to be appropriately balanced within the general ranges given above so that there are liquid crystalline properties imparted to the additive.

The type of mesogenic unit for the rod portion of the LC copolymer can be appropriately selected from known mesogenic units (main chain thermotropic liquid crystal polymers) including those of the general structure:

$$[-A-Y-X-Z-]_x \qquad (I)$$

as set for the in U.S. Pat. No. 4,952,334, for example, which is incorporated herein by reference. In the above formula, for example, in preferred embodiments, X can be $(CH_2)_n$, where n is an integer of from 2 to 10, n can range from about 2 to about 50, and Y and Z can each be —C(O)O— or —C(O)NH— or can be a single bond between two carbon atoms, and A can be p-phenylene, 1,4-, 2,6-, or 1,5-naphthylene, monosubstituted phenylene with methyl, chloro, or phenyl substitution; —ArCH=CHAr, where Ar is a phenyl ring, —AR—C(O)OAr—, —Ar—C(O)NHAr, or —ArOC-(O)—Ar—C(O)O—Ar—, as more fully depicted in the aforementioned patent. In addition another mesogenic unit which can be employed has the structure —Ar—C-(O)—NH—Ar—NH—C(O)—Ar—. The commercial rod polymers based on oxybenzoate units, 4,4'-biphenylene terephthalate units, and oxynaphthylene carboxylate units (the latter two including copolymers with the oxybenzoate units) can be especially preferred.

The flexible coil block in the block copolymer segment described above can be substantially similar to the matrix material by being either substantially the same in regard to the repeat units of the matrix or by having some of the same repeat units as described in U.S. Ser. No. 726,600. Thus, if a PET matrix is chosen a PET block segment in the copolymer would be selected. Alternatively, as shown in U.S. Ser. No. 812,606, filed on even date herewith, the flexible coil block and matrix material can merely be selected from the same polymer family, e.g., polyester, with poly(butylene) terephthalate and poly(ethylene) terephthalate, respectively, being chosen.

A preferred rod mesogen is the aromatic ester units and a flexible spacer, shown in Ober et al., Polymer J., 14, 9 (1982).

The Examples set forth hereinafter further illustrate the present invention.

EXAMPLES 1-6

The following examples should serve to illustrate certain embodiments of the present invention.

A series of flexible coil polymers (e.g., either PET or PBT) were mixed with various thermotropic liquid crystal polymer-containing additives (designated "TLCP" in the Table given below) at various mixing or blending temperatures set forth in the Table given below:

| Matrix (wt %) | TLCP (wt %) | Mixing Temp. (°C.) | Observations* |
|---|---|---|---|
| PBT[3](80) | Triad-4/PBT[1](20) | RT | TLCP was not adherent to the PBT matrix. The sample appeared different after being shaken. |
| PBT[3](80) | Triad-4/PBT[1](20) | 150 | TLCP particles appeared adherent to the PBT surface. The sample appeared the same after being shaken. |
| PBT[3](80) | XYDAR brand[2](20) | 150 | PBT and TLCP particles were totally separated from one another after being blended. |
| PET[4](90) | Triad-4/PBT[1](10) | 150 | TLCP particles appeared adherent to the PET surface. |
| PET[4](90) | Triad-4/PBT[1](10) | 175 | Mixture appeared more homogeneous than the previous sample. |
| PET[4](90) | Triad-4/PBT[1](10) | 200 | TLCP had partially melted. |

*Made by optical microscope.
[1]This designation is intended to cover the block copolymer comprising blocks of (A) a triad aromatic mesogenic unit with a $C_4$ polyalkylene spacer, of the general structure depicted by Ober et al. in Polymer J. 14, (1982) and (B) a poly(butylene terephthalate) unit. The average block ratio of A to B was 5:8. It has a Tg of about 36° C. and a melting point (Tm) of around 205° C. as compared to the Tg and Tm of PET and PBT being 78° C./260° C. and 39° C./225° C., respectively.
[2]from Amoco. It has a Tm of above 350° C.. No Tg was detected by DSC at temperatures of up to 350° C..
[3]ARNITE T06 200 brand from Akzo.
[4]ARNITE D02-300 brand from Akzo (molding grade).

EXAMPLE 7

Polyethylene terephthalate (PET) resin (BAGA 5018 resin from Akzo, fiber grade) in 20 mesh size powder form was mixed with varying amounts of the thermotropic liquid crystal polymer (TLCP) used in Examples 1-2 and 4-6 at 160°-175° C. for three to four hours under nitrogen. The weight/weight ratios for the PET/TLCP were: 99/1; 98/2; 95/5; 90/10; 80/20; 65/35; 50/50; 35/65; 20/80; 10/90; and 5/95, respectively. In all cases, the TLCP particles appeared to be adhered to the PET surfaces.

EXAMPLE 8

The block TLCP copolymer of Examples 1-2 and 4-6, which has a Tg of 36° C. and a Tm of 205° C. by DSC, was mixed with various polyester resins in 20 mesh powder form at 175° C. for three hours under nitrogen as in the Table below:

| Polyester/TLCP (wt/wt) | Observation (Optical Microscope) |
|---|---|
| 90/10[1] | TLCP particles appeared |
| 80/20[2] | adherent to the polyester |

[1]polyethylene terephthalate was used BAGA 5018 resin.
[2]polybutylene terephthalate was used ARNITE T06-200 resin.

The foregoing Examples are provided to merely illustrate certain embodiments of the present invention and should not therefore be construed in a limiting sense. The scope of protection sought is set forth in the claims which follow.

We claim:

1. A method of forming a preblend of a predominant amount of flexible coil polymer and a lesser amount of a block copolymer of a thermotropic liquid crystal polymer and a flexible coil polymer which comprises blending the polymer and block copolymer at a temperature above their respective glass transition temperatures but below their respective melt temperatures.

2. A method as claimed in claim 1 wherein the flexible coil polymer of both the polymer and the block copolymer is polyester.

3. A method as claimed in claim 1 wherein liquid crystal polymer comprises aromatic ester units and a flexible spacer.

4. A method as claimed in claim 2 wherein liquid crystal polymer comprises aromatic ester units and a flexible spacer.

* * * * *